(12) United States Patent
Colombo et al.

(10) Patent No.: US 9,587,500 B2
(45) Date of Patent: Mar. 7, 2017

(54) FLUID SEALING DEVICE FOR ROTATING MACHINES

(75) Inventors: Davide Colombo, Brescia (IT); Roberto Bini, Brescia (IT)

(73) Assignee: TURBODEN S.R.L., Brescia (IT)

( * ) Notice: Subject to any disclaimer, the term of this patent is extended or adjusted under 35 U.S.C. 154(b) by 967 days.

(21) Appl. No.: 13/806,670

(22) PCT Filed: Jul. 6, 2011

(86) PCT No.: PCT/IT2011/000229
§ 371 (c)(1),
(2), (4) Date: Feb. 4, 2013

(87) PCT Pub. No.: WO2012/004821
PCT Pub. Date: Jan. 12, 2012

(65) Prior Publication Data
US 2013/0136583 A1    May 30, 2013

(30) Foreign Application Priority Data

Jul. 8, 2010  (IT) .............................. BS2010A0119

(51) Int. Cl.
*F01D 11/00*    (2006.01)
*F01D 21/00*    (2006.01)
(Continued)

(52) U.S. Cl.
CPC ............ *F01D 11/003* (2013.01); *F01D 21/00* (2013.01); *F16J 15/3448* (2013.01); *F16J 15/46* (2013.01); *F05D 2240/55* (2013.01)

(58) Field of Classification Search
CPC ......... F01D 11/003; F01D 21/00; F16J 15/46; F16J 15/3448; F05D 2240/55; F05D 2240/63
See application file for complete search history.

(56) References Cited

U.S. PATENT DOCUMENTS 3,099,453 A * 7/1963 Dunn .................... F04D 29/143
                                                          277/348
5,267,736 A * 12/1993 Pietsch ................ B63H 23/321
                                                          277/306
(Continued)

FOREIGN PATENT DOCUMENTS

DE    34 40 635 A1    5/1986
FR    2 563 583 A1    10/1985
(Continued)

OTHER PUBLICATIONS

EPO, Machine Translation of FR2563583, Jan. 2016.*

*Primary Examiner* — Dwayne J White
*Assistant Examiner* — Adam W Brown
(74) *Attorney, Agent, or Firm* — Lucas & Mercanti, LLP

(57) ABSTRACT

A fluid sealing device for rotating machines having a rotor part including at least one disk carried by a rotating shaft rotating in and relatively to a stator part in the presence of a fluid is disclosed. The rotating shaft has a sealing system defining a first environment at a first pressure. The stator part has a wall in front of the disk of the stator part defining a second environment therewith containing a fluid at a second pressure. The device includes a movable ring placed between the wall of the stator part and the disk of the rotor part and has a front sealing gasket facing towards the disk. The movable ring is moved in the active position when the rotating machine is stopped to prevent the fluid passage from one environment to the other.

16 Claims, 3 Drawing Sheets

(51) Int. Cl.
*F16J 15/34* (2006.01)
*F16J 15/46* (2006.01)

(56) References Cited

U.S. PATENT DOCUMENTS 7,249,768 B2 * 7/2007 Keba .................. F16J 15/004
 277/348
7,837,199 B2 * 11/2010 Craig .................. F01D 11/003
 277/370

FOREIGN PATENT DOCUMENTS

FR 2563583 A1 * 10/1985 ........... F04D 29/146
GB 964 946 A 7/1964

* cited by examiner

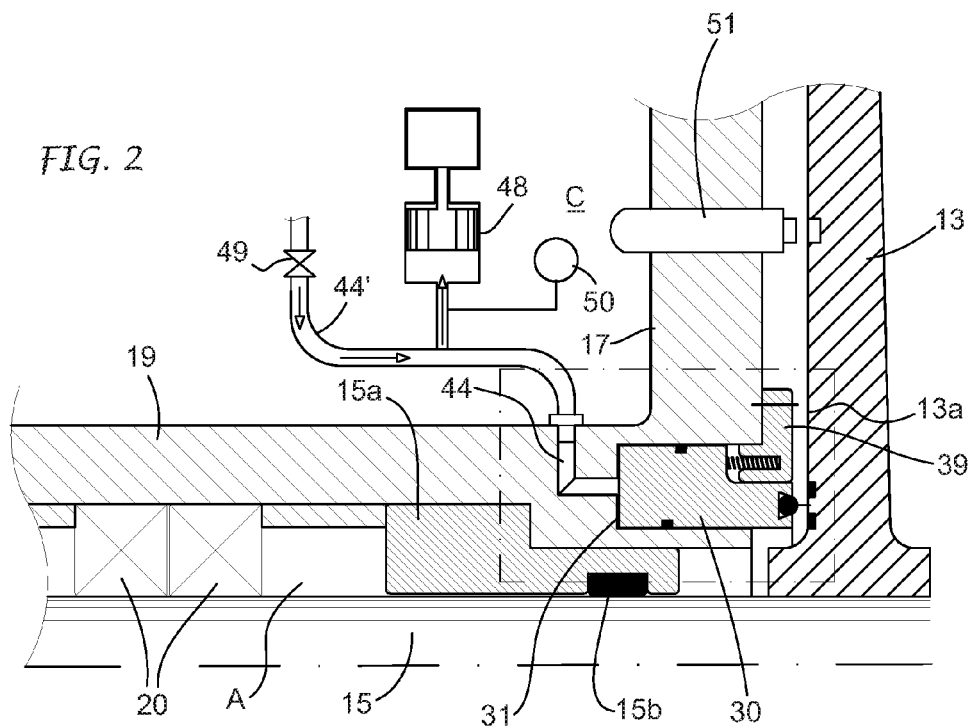
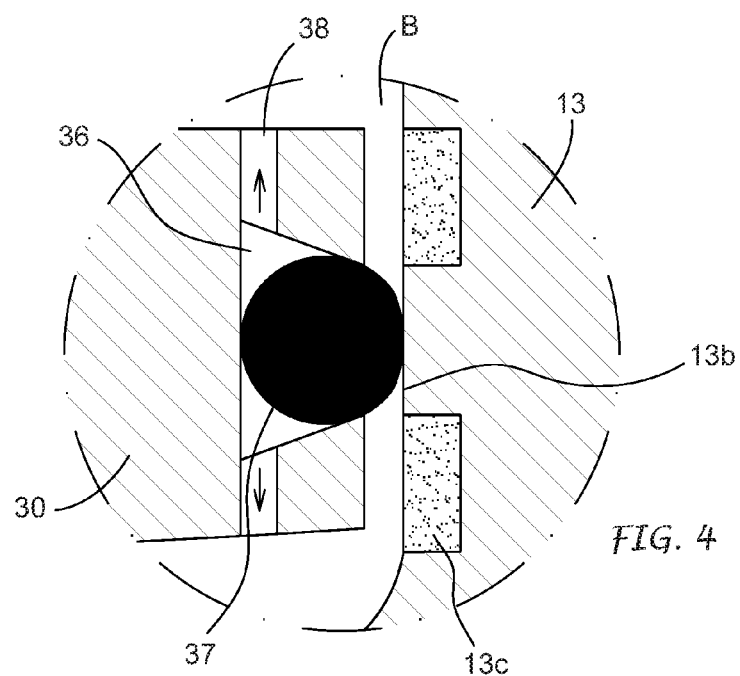

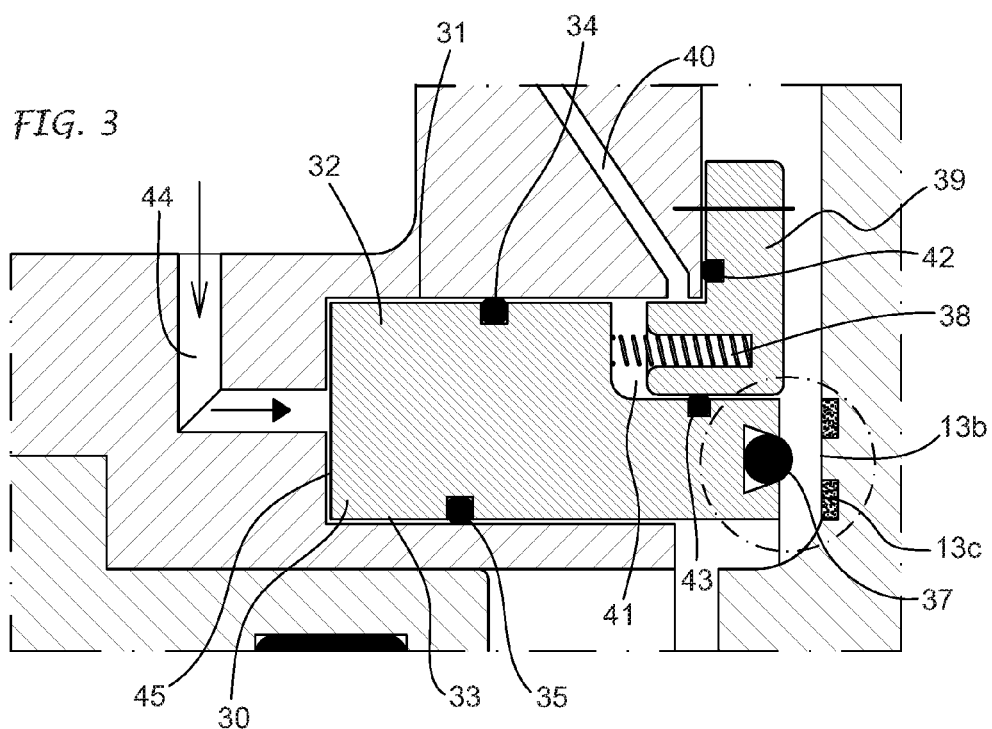
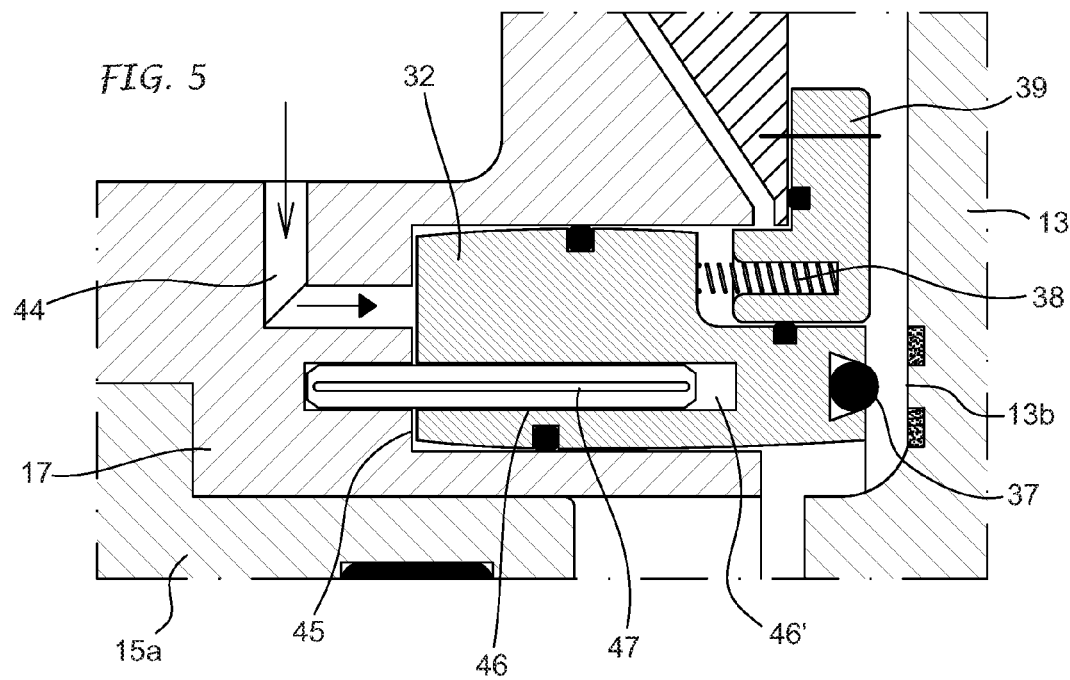

FLUID SEALING DEVICE FOR ROTATING MACHINES

CROSS-REFERENCE TO RELATED APPLICATIONS

This application is a 371 of PCT/IT2011/000229, filed Jul. 6, 2011, which claims the benefit of Italian Patent Application No. BS2010A000119, filed Jul. 8, 2010, the contents of each of which are incorporated herein by reference.

FIELD OF THE INVENTION

The present invention relates generally to rotating machines of the type having a rotor part rotating in and relatively to a stator part or a case in the presence of a fluid, and it refers in particular to a sealing device to confine such a fluid in an inner environment of a rotating machine especially when the latter is stopped because of failures or maintenance.

STATE OF THE ART

The use of the above said type of rotating machines is frequent in industry, the machines employing a fluid whose characteristics require effective confinement inside them to prevent leakages to other members. This confinement is more usually achieved by sealing systems in association with the shaft of the rotor part suitable to prevent the leak of fluid. In the art several solutions have been adopted, including mechanical seals representing a known and important item, particularly in higher-quality applications.

In this regard, for example, the application of fluid sealing devices for rotating shafts of turbines operating with an organic operating fluid in ORC systems (Organic Rankine Cycle) is of particular interest, as well as in refrigeration systems with an organic fluid cycle, such as centrifugal compressor chillers.

For easiness of discussion herein it will referred to a single stage turbine expander 10 of a ORC system, as reported as an example in the simplified scheme shown in FIG. 1 of the appended drawings.

Such an expander comprises essentially a turbine rotor 11 and a case or stator part 12. The turbine rotor 11 is composed of at least one disk 13 carrying a rotor blading 14, connected to a shaft 15 rotating inside case 16 in a vapour environment of an organic operating fluid.

The case or the stator part 12 of the expander consists of a shield 17 connected, on a side, with a volute 18 and, on the other side, with a sleeve 19 coaxially supporting the shaft 15 of the rotor with the interposition of bearings 20 and at least one sealing system consisting, to for example, of a housing 15a carrying the sealing system 15b of mechanical, elastomeric, stuffing box or mixed type, or more, operating on the rotating shaft 15. The volute 18 is usually provided with one or more inlets 21 for adduction of the operating fluid at a feed pressure, an outer ring 22, surrounding the turbine rotor 11 and carrying a stator blading 23, and a flange 24 connecting to an exit duct allowing the expanded operating fluid to be conveyed to a remaining part of the ORC system, including, among other things, at least one condenser—not shown.

The operating fluid fed through the nozzle(s) 21 of the volute 18 is expanded in succession in the stator 23 and rotor 14 blading, according to the known art. For its efficient expansion, the operating fluid, that can be for example n-butane, is generally introduced in the turbine expander at a working pressure substantially higher than the pressure outside the case of the machine. Then, in an environment A of the expander, between the shaft and its supporting system, a first pressure usually closer to the atmospheric pressure may be obtained, whereas in the environment B inside the case or, nay, between the rotor disk and the case shield, there is a second pressure higher than or lower than the first, most generally of several bars of absolute pressure and mostly variable in relation to the temperature of the condenser downstream of the expander and in relation to the presence or absence of balancing holes 16 passing through the disk 13.

Evidently, in such conditions of pressure imbalance, the working fluid is prone to flow from the environment B to environment A or vice versa. During the normal machine operation this trend will be appropriately impeded by the sealing system 15b on the shaft 15, a system commonly selected and created for this specific purpose. The seal against the working fluid passage from one environment to the other may become rather difficult if not even unreliable in the non operating conditions of the machine, i.e. when the rotation of the rotor part stopped, and in consequence of the shaft. Such a stop may occur both under normal conditions, i.e. when the machine is stopped for reasons not related to the proper operation of the sealing system 15a, 15b on the rotating shaft 15, and in abnormality conditions of the fluid sealing, when the sealing system 15b is not able to effectively provide a restriction of the fluid passage between the environment B and the environment A. On the other hand it is known that the rotating sealing devices, when they are stationary, especially in the presence of significant thermal expansions, may lose their effectiveness and have greater leaks, sometimes catastrophic.

Hence the need and demand for an efficient and effective separation of the above defined environments A and B in a rotating machine in every condition thereof, both operating as well as non operating conditions.

Indeed, this problem has already been addressed with a sealing device described in the previous patent application BS 2009 A 00051 of the same applicant, according to which the rotor shaft together with the rotor part is axially movable between an operating position, in which the head of said shaft is far from an inner end of the supporting sleeve facing towards the stator assembly, and a rearward position in which the head of the turbine shaft or part of the rotor assembly rests on said inner end of said sleeve by the interposition of at least one front sealing gasket. This embodiment still requires an axial displacement of the shaft and the rotor part when the machine is stopped.

OBJECT OF THE INVENTION

Starting from these premises, it is an object of the present invention to put forward an innovative sealing device to confine effectively and safely the fluid inside the case of stator part of a rotating machine without having to move the operative members particular of the machine, but with the aid of additional means activable from the outside, when the machine is stopped.

Another object of the invention is to put forward a sealing device for the above mentioned use and function than could be advantageously applied to any rotating machine operating in a pressurized fluid environment, such as a turbine expander, a cooler with vapour cycle and the like.

Said objects are achieved, according to the invention, by means of a sealing device for a rotating machine having a rotor part rotating with a shaft inside a stator part in the presence of a pressurized fluid, wherein said device is placed and operated by control between a component of the stator part and a component of the rotor part and it is activated when the machine is stopped to prevent the fluid passage between the two environments inside the machine, one at a pressure different from the other. At least such benefits are thereby achieved

- to ensure the confinement of the operating pressurized fluid between the rotor part and the stator part of the machine when the latter is stopped and the rotating seal may suffer greater leaks than when the machine is working;
- to be able to stop the machine in case of seal breakage on the shaft and consequent leaks; and
- to enable the replacement of the seal without connecting the interior of the machine containing the pressurized fluid with the outside.

BRIEF DESCRIPTION OF THE DRAWINGS

On the other hand the invention will be illustrated in more detail in the description course made with reference, by way of example only and without limitation, to the attached drawings, in which;

FIG. 2 shows a sectioned portion of a rotating machine comprehensive of the sealing device according to the invention;

FIG. 3 shows an expanded view of the portion in the box in FIG. 2;

FIG. 4 Shows an expanded view of the encircled portion in FIG. 3 and with the sealing device in active position;

FIG. 5 shows a variation of the unit of FIG. 3.

DETAILED DESCRIPTION OF THE INVENTION

Figure 1:
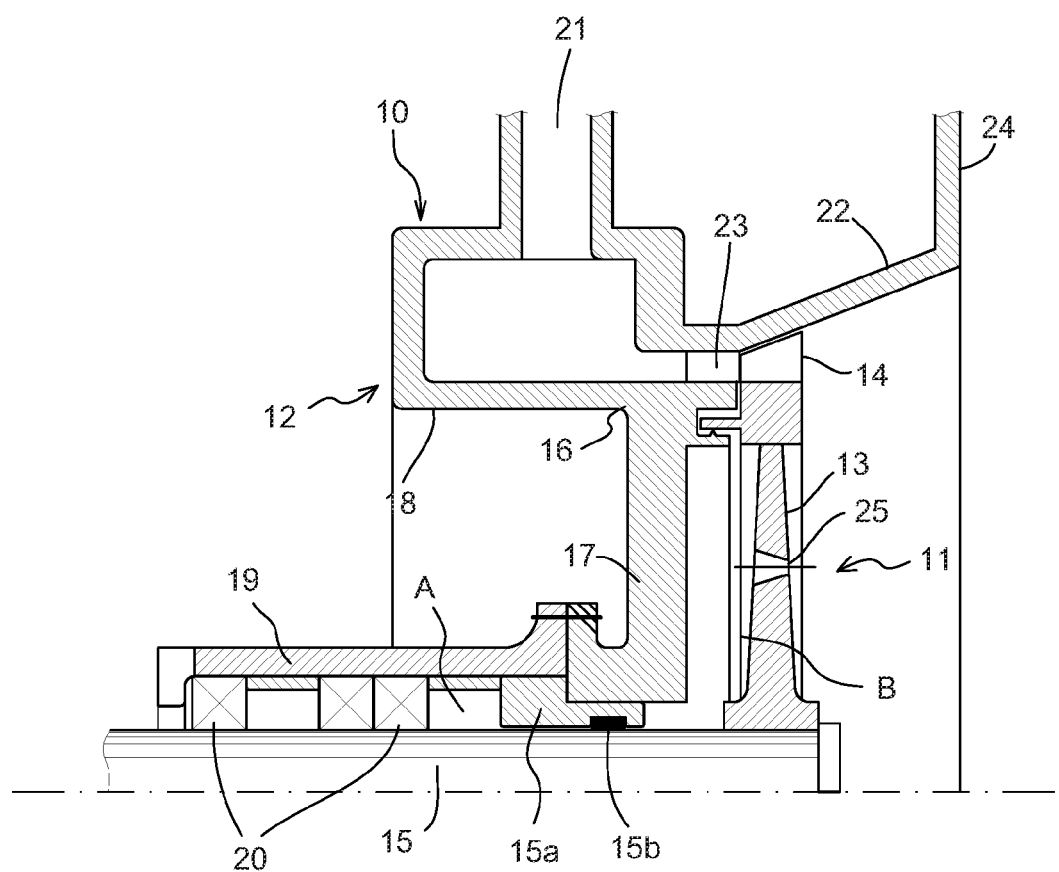
FIG. 1 shows a schematic section of part of a turbine expander indicative of the state of the art and previously commented.

Essentially, the portion of rotating machine shown in FIG. 2 includes components and parts completely equivalent to those above represented and described in relation to FIG. 1, which for easiness are denoted by the same reference numbers used in said FIG. 1.

Therefore, the portion of the machine in FIG. 2 comprises a shaft 15 carrying a disk 13 that can be carried out as a whole with the shaft itself, otherwise mechanically or by welding fastened thereto, in any case in such a way to have a watertight, i.e. fluid—tight, connection between the shaft and the disk. Other disks, not represented in figure, and not relevant for the object of the present treatise, may be directly or indirectly connected to the shaft 15 by a connection to the disk 13.

The shaft 15 can be supported in a supporting sleeve 19 by interposed bearings 20 placed far away from the disk 13, that in this case is cantilevered relatively to the shaft—bearings system. The shaft 15 may anyway be supported even in other positions, and by way of example, the bearings 20 may be made of rolling bearings, or journal bearings with hydrostatic or hydrodynamic operation, or magnetic supporting systems too (magnetic bearings).

Around the shaft 15, between it and the supporting sleeve 19, a housing 15a carrying at least one sealing system 15b is provided, allowing the rotation of the shaft 15, however obtaining an effective seal preventing, or at least minimizing, the passage of fluid from an environment A, that in FIG. 2 is located to the left of the sealing system 15b, and an environment B the side of the disk 13, also on the left, is faced to. The sealing system can be constituted for example of one or more mechanical seals, one or more elastomeric ring seals, one or more stuffing box seals, or a combination of these elements, or more.

The supporting sleeve 19 of the rotating shaft 15 can be integral or fixed with a static structure 17, or rather non-rotating, fully comparable to the shield of the case or the stator part of the turbine expander in FIG. 1. This static structure 17 has a part that is in front of the disk 13 and separating the environment B from the environment C outside of the structure itself.

Typically the environment A may correspond to an environment with a first pressure where the bearings 20 are; the environment B corresponds to part of the inner environment of the rotating machine, wherein there is an operating fluid at a second working pressure; the environment C is at ambient pressure outside of the static structure or case 17 depending on the location for the machine installation.

The sealing system 15b is then subjected to the pressure difference between the environment A and the environment B, the fluid that is in the environment B, with higher pressure, having then the tendency to flow towards the environment A at lower pressure, such a tendency during the machine operation will be, as mentioned above, usually hampered by the sealing system 15b.

The device according to the present invention, in accordance with what it has been indicated, is designed to prevent the fluid passing from the environment B to the environment A when the machine is stopped.

The device herein proposed comprises at least one movable ring 30 accommodated and axially guided in a corresponding annular recess 31 obtained in a wall of the static structure 17 (shield or case) in front of the disk 13 carried by the rotating shaft 15.

By and large, the annular recess 31 and the movable ring 30 are concentric with the shaft 15, and whereas the recess 31 has a cylinder function, the movable ring 30 can be moved by control, like a piston, in said recess, towards and away from an overlooking surface 13a of said disk 13.

Said movable ring 30 has two walls 32, 33, external and internal respectively, with a high degree of surface finishing. On each of these two walls at least one seal 34 and 35 is applied respectively, each seal being formed by an elastomeric ring, for example, such as an O-ring that can slide on the respective outer or inner surface of the recess 31, while maintaining an effective fluid sealing. The outer and inner walls 32, 33 of the movable ring 30 can be cylindrical as shown in FIGS. 2 and 3, but they may also be rounded like barrel or bicone shape—FIG. 5—starting from the application area of the respective gaskets 34, 35. This trick provides the guide of the ring 30 in the annular recess 31 and advantageously at the same time allows to prevent interferences or blocks of the ring with the recess surfaces and the risks of "extrusion" of one, the other or both the seals 34, 35 to be caused.

The movable ring 30 has a head portion facing towards the disk 13, and on the front of said portion the movable ring 30 is provided with an annular throat 36 in which an annular front sealing gasket 37 is housed and held formed, by way of example, by an elastomeric 0-ring .

Preferably, the throat 36 accommodating such a front sealing gasket 37, as seen in section, is dovetailed and communicates with its outside, better with the environment B, through one or more holes or radial relief notches 38, thereby aiding to prevent the release/ejection of the front gasket in the presence and with the increase of a fluid pressure that may reach and accumulate in the throat.

The movable ring 30 can be displaced between an inactive rearward position (to the left in the drawings), in which the front sealing gasket 37 is away from the overlooking surface 13a of the disk 13, and an active forward position (to the right in the drawings), in which the front sealing gasket 37 rests on the overlooking surface 13a of said disk 13.

In the example shown, the movable ring 30 is and remains typically displaced backwards in its inactive position by the action of a plurality of pre-compressed thrust springs 38, carried by a fixed countercheck ring 39 constrained to the static structure 17 of the machine and extending in front of a part of said ring 30. As seen radially, the fixed countercheck ring 39 can be placed and constrained to the static structure 17 outside or inside the movable ring 30, while leaving exposed the portion of the head of the latter carrying the front sealing gasket 37 facing towards the disk 13.

The springs 38 operating between the fixed countercheck ring 39 and the movable ring 30 can be of the helix type, as shown, but not excluding other patterns of springs matching such a target.

The displacement of the movable ring 17 in the active position (to the right in the drawings—FIG. 4) is carried out when the machine is stopped, or after some predetermined time from the end of the rotation of the shaft 15. Such a displacement of the movable ring 30 is achieved with a controlled supply of a liquid or gaseous actuation fluid under pressure from the outside to a chamber 45 on the back of said ring 30, between this and the bottom of the recess 31 accommodating it.

The supply of the control fluid can be carried out through a delivery pipe 44' connected to an adduction channel 44 opening onto the chamber 45 (FIG. 2).

When the ring is in the active position, its front sealing gasket 37 is pressed against a part of the surface 13a of the disk 13 integral with the shaft 15, in order to achieve and maintain an efficient separation of the environment B with respect to the sealing area 15b and, therefore, relatively to the environment A, for the whole duration of the machine stop.

In this regard, then it is preferable the front sealing gasket 37 is accommodated against a limited annular zone 13b of the surface 13a of the disk 13—FIG. 4—in case surrounded by an area of abradable material 13c, so as to exclude a direct contact of the head of the movable ring with the disk material when the ring is in the forward position or its forward stroke is exaggerated for any cause or reason, especially when the ring is gone forward by mistake during the rotation of the machine.

Alternatively and for the same purpose, the surface which must support the front sealing gasket 37 when the ring is in active mode can also be completely defined by a layer of abradable material.

Before every restart of the machine, the activation fluid delivery to the chamber 45 behind the movable ring 30 is ended, so the latter is returned to the inactive rearward position pushed back by the springs 38.

It should be noted that alternatively, or in combination with the action exerted by the springs, the displacement backwards of the movable ring 30 can also be realized feeding from the outside, through an adduction duct 40 obtained in the static structure 17, a pressurized fluid to a compartment 41 incorporated between two opposing surfaces of the movable ring 30 and the fixed countercheck ring 39 and then providing these two components with additional sealing gaskets 42 and 43 in appropriate locations. Obviously, because the displacement backwards of the movable ring 30 with the aid of a fluid is effective, it is necessary that the fluid pressure in the channel 44 is sufficiently lower than the fluid pressure fed through the duct 40.

Afterwards the movable ring 30 may also be preferably centered and guided positively in the longitudinal direction by two or more guiding pins 46, angularly spaced, tapped in the static structure 17 and accommodating into corresponding holes 46' obtained in the ring itself. Each guiding pin 45 will have a length not limiting the stroke of the ring towards the inactive position and will also be provided lengthwise with a land or side groove 47 or other suitable means to ensure the draining and thus to prevent the accretion of a fluid into the hole 46 in which is guided, and that could impede the ride backwards of the ring.

It will also be preferable to be able to check the ring displacement towards the active position and even more its return towards the inactive position.

The displacement check of the ring 30 in the inactive position can be carried out by a limit switch or microswitch—not shown—adapted for detection of the rearward position of the ring.

Otherwise the check of the inactive position of the movable ring can be realized through a measurement of the pressure and/or the volume of the activation fluid fed into the chamber 45 through the duct 44'. In particular, if the activation fluid consists of a gaseous body, such as compressed air or, preferably, nitrogen or other inert gas under pressure, on the duct 44'—FIG. 2—a cylinder 48 is inserted downstream of a valve 49, suitable to contain a volume of the gaseous body and provided with a pressure detector 50. Then, after the return of the movable ring 30 into the rearward position and the closure of the valve 49, the cylinder 48 is operated to deliver the gaseous body volume contained therein into the chamber 45 between the movable ring 30 and recess 31 accommodating it. When the movable ring 30 is completely rearward in the recess 31, the chamber 45 will have obviously a lower volume than if the movable ring has not actually reached such a rearward position. Therefore the measurement of the achieved pressure is an effective way to check the return of said movable ring in the inactive position and correspondingly its removal and concrete detachment from the disk 13 of the rotor part. Finally, between the static structure 17 and the disk 13 will be provided an effective and secure connecting system, such as a locking latch 51 FIG. 2, able to hold said disk 13 in place relatively to the stator at least when, in case of machine stopped, it is necessary to change the sealing system on the shaft, that necessarily entails the disassembly of the bearings 20 and then the release of the shaft 15 carrying the disk itself.

However alternations or variations of details of the above described device may be made without leaving the object of the invention. So, for example, the movable ring 30 and the fixed countercheck ring 39 may be configured differently than represented. In particular, the displacements of the movable ring 30 from its position to the other position can then be controlled by mechanical means and by adopting appropriate limit means. In addition, the annular sealing gasket 37, instead of being disposed ahead of the movable ring 30, can be applied radially to the same ring to rest when said ring is in an active position on a radial surface particular of the rotor disk 13 and to realize a fluid sealing always in order to separate the environment A from the environment B.

The invention claimed is:

1. Fluid sealing device for rotating machines with a rotor part rotating in and relatively to a stator part or a case in the presence of fluid, where: the rotor portion comprises at least one disk carried by a rotating shaft supported by bearings and provided with at least one sealing system defining a first environment at a first pressure; the stator part has a wall in front of the disk of the rotor part; the rotor part and the stator part delimit between them a second environment containing a fluid at a second pressure higher or lower than the first pressure in said environment, and the first environment and the second environment are separated by said sealing system on the rotating shaft, wherein a movable ring concentric with said rotating shaft placed between said wall of the stator part and the disk of the rotor part and provided with at least one annular sealing gasket facing towards a portion of said disk, and is provided, and wherein said ring is axially movable by control between an inactive rearward position, in which the sealing gasket is far from said disk, and a forward active position in which said sealing gasket rests on said disk, the movable ring being moved in said active position when the rotating machine is stationary to prevent the fluid passage from one of said environment to the other environment, wherein the movable ring is accommodated and guided in an annular recess obtained in the wall of the stator part in front of the disk of the rotor part and has a head portion with a throat carrying the annular sealing gasket facing towards the disk of the rotor part, and wherein the movable ring is associated with the annular recess with the interposition of sealing gaskets, and can be moved from the inactive rearward position to the forward active position by means of a pressurized fluid fed to said annular recess, and from the active position to the rearward inactive position by thrust springs operating between the movable ring and a fixed countercheck ring constrained to said wall of the stator part.

2. Device according to claim 1, wherein the annular sealing gasket is arranged in a throat in front of the head portion of the movable ring, facing towards and intended to sealingly engage against an overlooking side surface of the disk of the rotor part.

3. Device according to claim 2, wherein the throat containing said annular sealing gasket has a dovetailed section and communicates with the second environment (B) through one or more holes or radial relief notches.

4. Device according to claim 1, wherein the annular sealing gasket is applied in a radial throat of the movable ring, facing towards and intended to rest and sealingly engage on a radial surface of the disk of the rotor part.

5. Device according to claim 1, wherein the displacement of the movable ring from the forward active position to the inactive rearward position is caused by the delivery of a pressurized fluid in a compartment comprised between two opposing surfaces of the movable ring and of the fixed countercheck ring, said compartment being defined by sealing gaskets mounted between the movable ring and the fixed countercheck ring.

6. Device according to claim 1, wherein the displacement of the movable ring from the forward active position to the inactive rearward position is caused by the concurrent action of said thrust springs and a pressurized fluid fed in a compartment comprised between two opposing surfaces of the movable ring and the fixed countercheck ring, said compartment being defined by sealing gaskets mounted between the movable ring and the fixed countercheck ring.

7. Device according to claim 1, wherein said fixed countercheck ring extends in front of at least a portion of the movable ring, vacating the head portion of the latter carrying the annular sealing gasket facing towards one side of the disk of the rotor part.

8. Device according to claim 1, wherein said fixed countercheck ring can be arranged radially outwards or inwards the movable ring.

9. Device according to claim 1, wherein said movable ring has an outer cylindrical wall and an inner cylindrical wall.

10. Device according to claim 1, wherein said movable ring has two outer and inner cylindrical walls having barrel or bicone shape.

11. Device according to claim 1, wherein said movable ring is guided longitudinally on at least two guiding pins, angularly spaced, tapped in said wall of the stator part and accommodating into corresponding holes obtained in the ring itself.

12. Device according to claim 1, wherein the annular sealing gasket, when the movable ring is in the forward active position, rests on an annular surface of the disk of the rotor part surrounded by an annular portion of abradable material, where the radial amplitude of this annular portion is at least equal to the radial size of the head portion of the movable ring.

13. Device according to claim 1, wherein the front sealing gasket, when the movable ring is in the forward active position, rests on an annular surface defined by an abradable material, where the radial extent of this annular surface is at least equal to the radial dimension of the head portion of the movable ring.

14. Device according to claim 1, also comprising means for checking the displacement of the movable ring from the forward active position to the rearward inactive position and means for detecting the pressure and / or volume of control fluid to check the displacement of the movable ring from the rearward inactive position to the forward active position.

15. Device according to claim 1, wherein the movable ring can be moved between the rearward inactive position and the forward active position by mechanical means.

16. Rotating machine incorporating a sealing device according to claim 1.

* * * * *